(12) United States Patent
Davidson et al.

(10) Patent No.: US 9,032,028 B2
(45) Date of Patent: *May 12, 2015

(54) ROLE-BASED DISPLAY OF DOCUMENT RENDITIONS FOR WEB CONFERENCING

(71) Applicant: International Business Machines Corporation, Armonk, NY (US)

(72) Inventors: Scott Davidson; William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,795

(22) Filed: Apr. 24, 2014

(65) Prior Publication Data
US 2014/0237390 A1    Aug. 21, 2014

Related U.S. Application Data

(63) Continuation of application No. 11/563,706, filed on Nov. 28, 2006, now Pat. No. 8,769,006.

(51) Int. Cl.
*G06F 15/16*    (2006.01)
*G06F 3/00*    (2006.01)
(Continued)

(52) U.S. Cl.
CPC ............... *H04L 65/403* (2013.01); *H04L 29/06* (2013.01); *G06Q 10/10* (2013.01); *G06F 3/04842* (2013.01)

(58) Field of Classification Search
CPC .............................. H04L 65/403; H04L 29/06
USPC .......................................... 709/204; 705/753
See application file for complete search history.

(56) References Cited

U.S. PATENT DOCUMENTS 6,359,711 B1    3/2002  Cole et al.
7,099,798 B2    8/2006  Yu et al.
(Continued)

FOREIGN PATENT DOCUMENTS

WO    00/79791 A1    12/2000
WO    02/103549 A2    12/2002

OTHER PUBLICATIONS http://www.seriousmagic.com/products/presentations/ovation-for-powerpoint-templates.cfm; Nov. 3, 2006, p. 1.
(Continued)

*Primary Examiner* — Asghar Bilgrami
(74) *Attorney, Agent, or Firm* — BainwoodHuang

(57) ABSTRACT

A method and system for providing role-based renditions of a shared document during a Web conference, in which different renditions of the shared document are provided to different Web conference participants based on the participants' roles in the conference. A participant with sufficient privileges, such as a presenter, is allowed to associate different participant roles with corresponding renditions through a user interface. The disclosed system further operates to dynamically adjust to the changing roles of participants during a Web conference, such that the rendition provided to any given user is changed in response to that user's role changing during the Web conference. The role of a Web conference participant may be based on any specific information obtained regarding that participant, such as information in a user profile in a user database, or other user information. The disclosed system further operates to provide shared document renditions that are specific to individual user attributes, such as user accessibility settings. A user interface provided to the presenter or other privileged participant allows that participant to indicate which participant roles are to be provided which renditions, e.g. which participant roles will be provided with renditions including additional metadata. Such metadata may, for example, include speaker notes, rendered on the presenter's screen, but not on the attendees screens.

13 Claims, 4 Drawing Sheets

(51) Int. Cl.
   *H04L 29/06* (2006.01)
   *G06Q 10/10* (2012.01)
   *G06F 3/0484* (2013.01)

(56) References Cited

U.S. PATENT DOCUMENTS

| | | |
|---|---|---|
| 7,139,761 B2 | 11/2006 | McKibben et al. |
| 7,353,252 B1 | 4/2008 | Yang et al. |
| 2002/0140724 A1 | 10/2002 | Qureshi et al. |
| 2003/0105820 A1 | 6/2003 | Haims et al. |
| 2003/0160813 A1 | 8/2003 | Raju |
| 2003/0227479 A1 | 12/2003 | Mizrahi et al. |
| 2005/0097440 A1* | 5/2005 | Lusk et al. .................. 715/500.1 |
| 2006/0053380 A1 | 3/2006 | Spataro et al. |
| 2006/0067250 A1 | 3/2006 | Boyer et al. |
| 2007/0203980 A1 | 8/2007 | Andersen |
| 2008/0091838 A1* | 4/2008 | Miceli .......................... 709/231 |

OTHER PUBLICATIONS www.webex.com; Nov. 3, 2006, p. 1.
ConferenceCall.com; Nov. 3, 2006, p. 1.
www.meetmenow.com; Nov. 3, 2006, p. 1.
www.presenternet.com; Nov. 3, 2006, p. 1.
www.gotomeeting.com; Nov. 3, 2006, p. 1.
www.presentations.com; Nov. 3, 2006, pp. 1-4.
www.masterviews.com; Nov. 3, 2006, pp. 1-6.
http://www.microsoft.com/office/livemeeting/prodinfo/default.mspx; Nov. 3, 2006, pp. 1-2.
http://office.microsoft.com/en-us/assistance/HP030885571033.aspx; Nov. 3, 2006, pp. 1-3.

* cited by examiner

ROLE-BASED DISPLAY OF DOCUMENT RENDITIONS FOR WEB CONFERENCING

FIELD OF THE INVENTION

The present invention relates generally to Web conferencing technology, and more specifically to a method and system for providing role-based displays of document renditions in a Web conference.

BACKGROUND OF THE INVENTION

As it is generally known, Web conferencing technology has become an increasingly prevalent way of sharing or disseminating information. Web conferencing systems enable geographically distributed users to participate in a virtual conference over the Internet. The conference is provided to each participant through software executing on their client computer system, such as a Web browser or other client software. Web conferences are "synchronous" meetings, in which all users concurrently participate. This stands in contrast to "asynchronous" Web based systems for sharing information through posted messages, such as on-line discussions known as "forums", "message boards", or "bulletin boards". The most basic feature of a Web conferencing is screen sharing. Screen sharing enables conference participants to view content from a presenter's screen on their own screens.

When presenting a document in a Web conference, there are situations in which it would be advantageous for different participants to be provided with different information. For example, it may be desirable for some participants to see additional metadata that is hidden from other conference attendees. One situation that illustrates this need is when a presentation is shared through a Web conference, the presenter would often like to see a set of speaker notes in addition to the contents of the presentation slide, without sharing those notes with the conference attendees.

In the past, one solution to this problem has been for the conference presenter to view their speaker notes out-of-band of the presentation, such as in a printed hardcopy, or by displaying a separate file in a separate user interface window during the presentation. However, a major drawback of such out-of-band approaches is that the presenter needs to manually keep the out-of-band notes material synchronized with the shared presentation content.

In the area of in-person presentation technology, some existing systems have provided what is known as a "teleprompter" feature. These existing systems have provided a display of speaker notes to a presenter while he or she is making an in-person presentation. Existing systems have fallen short, however, of providing any way to allow different renditions of a shared document to be viewed by different Web conference participants based on their different roles. Existing systems cannot associate different presentation renditions with corresponding participant roles. Accordingly, they cannot be used to support defining multiple renditions of a shared Web conference document, such as a presentation document, and then displaying those renditions during the Web conference such that each participant's specific view of the shared document is determined based on their role in the conference. Moreover, there is no capability in existing systems for allowing roll-based conference renditions to be dynamically changed, during a Web conference, in order to adapt to dynamically changing participant roles. Further, there is no way in existing systems to provide different renditions based on roles, where the roles may be automatically determined based on whether a participant is located in a specific geography, and/or is a member of a specific business organization.

In addition, existing systems have failed to provide shared Web conference content renditions that are specific to individual user attributes. For example, user accessibility settings typically are not considered when a shared document is rendered to a user during a Web conference. Accordingly, if a low vision user has set their display for high contrast, it would be desirable for the rendition of the shared document provided to them to be in high contrast as well. Similarly, if a color blind user has an indication of their color blindness in their user profile, it would be desirable for their rendition of a shared document to use visual clues other than color to provide visual distinctiveness.

Accordingly, it would be desirable to have a new system for providing different renditions of shared Web conference content based on the roles and user attributes of Web conference participants.

SUMMARY OF THE INVENTION

To address the above described and other shortcomings of previous techniques, a method and system for providing role-based renditions of a shared document in a Web conference is disclosed. In the disclosed system, different renditions of a document shared through a Web conference are provided to different Web conference participants based on the participants' roles. A participant with sufficient privileges, such as a presenter, is allowed to associate different shared document renditions with corresponding participant roles through a role-based renditions configuration user interface. During the Web conference, a shared document's different renditions are automatically provided to different conference participants, such that a given rendition is provided only to those participants having a role that has been associated with that rendition, for example through the role-based renditions configuration user interface.

The disclosed system further operates to dynamically adjust to the changing roles of participants during a Web conference, such that the rendition provided to any given user is changed in response to that user's role changing during the Web conference. The disclosed system may be embodied to determine the role of a Web conference participant based on any specific information obtained regarding that participant, such as information in a user profile in a user database, or other user information. The role assigned to a user may, for example, reflect whether the participant is the presenter for the Web conference, whether the participant is a instructor of a course being taught through the Web conference, the geographic location of the user, whether the user is a member of a business organization, or other information describing the user.

The disclosed system further operates to provide renditions of a shared document that are specific to individual user attributes. For example, user accessibility settings may be used to determine the specific rendition sent to a given user.

The disclosed system can be embodied to apply to any specific type of document shared in a Web conference, if the shared document can have multiple meaningful renditions for Web conference participants having different roles and/or user attributes.

In one embodiment, when a document is being shared through a Web conference, the disclosed system provides a role-based renditions configuration user interface to a sufficiently privileged participant, for example a presenter participant, that allows that participant to indicate which participant roles are to be provided renditions that include additional metadata. The participant provided with role-based renditions configuration user interface could, for example, then indicate that the metadata is to be displayed to a participant that has the presenter role, but not to all other participants. Such metadata may, for example, include speaker notes, rendered on the presenter's screen, but not on the attendees screens. In such an example, based on the previously performed configuration made through the role-based renditions configuration user interface, as the presenter clicks through the pages of the presentation, the disclosed system automatically provides a rendition to the presenter that includes each slide's content and also any associated metadata. The disclosed system further operates based on the configuration made through the role-based renditions configuration user interface to automatically provide a rendition to the other participants that is the same as that shown to the presenter, but without the metadata.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
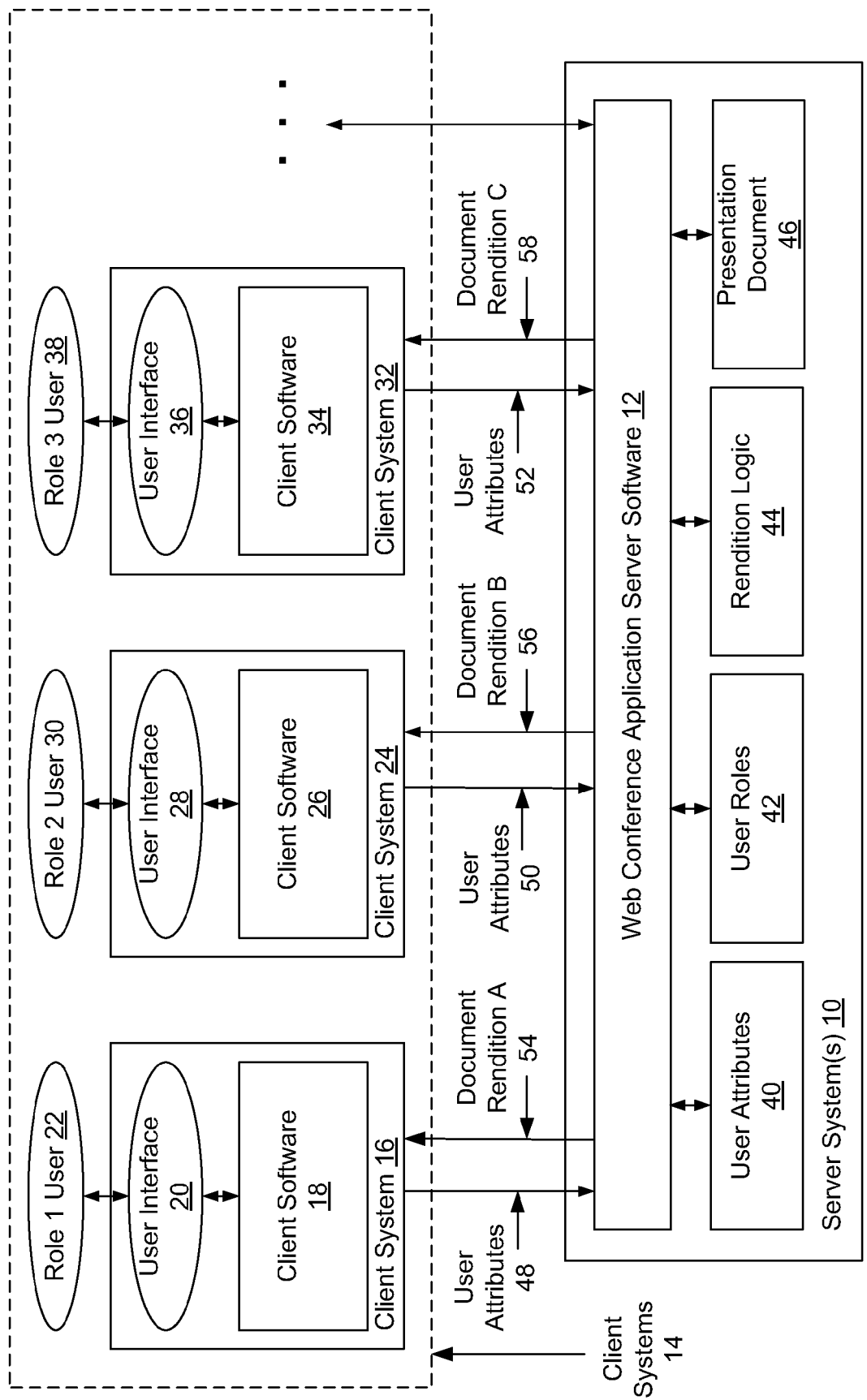
FIG. 1 is a block diagram showing software and hardware components in an illustrative embodiment of the disclosed system.

As shown in FIG. 1, components in an operational environment of an illustrative embodiment of the disclosed system include Server System(s) 10 and Client Systems 14. The Server System(s) 10 has various software components executing thereon, shown including Web Conference Application Server Software 12 and Rendition Logic 44. The Server System(s) 10 further includes User Attributes 40, User Roles 42, and Presentation Document 46. The Presentation Document 46 is an illustrative example of a shared document provided during a Web conference that is capable of multiple renditions. Those skilled in the art will recognize that the disclosed system is not limited in application to presentation documents, and that the present invention may be applied to any specific type of shared content that is provided to one or more participants in a Web conference, such as in a Web conference provided by the Web Conference Application Server Software 12 shown in FIG. 1. The User Attributes 40 and User Roles 42 shown in the Server System(s) 10 may be maintained as a database or the like, as further described below.

The client systems 14 include a number of specific client systems, shown for purposes of illustration as including client systems 16, 24, 32, etc. Each of the client systems 14 includes client software, shown as client software 18, 26, 34, etc., which generates an user interface to a Web conference provided by the Web Conference Application Server Software 12. For example, the Client Software 18 in Client System 16 generates User Interface 20 for Role 1 User 22, the Client Software 26 in Client System 24 generates User Interface 28 for Role 2 User 30, and the Client Software 34 in Client System 32 generates User Interface 36 for Role 3 User 38. The user interfaces 20, 28 and 36 may be any specific type of user interface, such as, for example, a graphical user interface, and may be navigated by each respective user through any specific type of user interface device, such as a computer keyboard or mouse, and/or using voice commands or the like.

The client software 18, 26 and 34 may be embodied as software dedicated to providing Web conferences or the like, or as a Web browser program. For example, in one embodiment, each of the client software components 18, 26, and 34 may be made up of program code operable to display various specific types of content resources received from the Web Conference Application Server Software 12 during a Web conference, within a display window providing the Web conference to a user within a multi-window graphical user interface.

The Server System(s) 10 may be embodied as any specific number of software processes and/or components executing on one or more computer systems that are communicably connected. Such computer systems may, for example, each consist of at least one processor, program storage, such as memory, for storing program code executable on the processor, one or more input/output devices and/or interfaces, such as data communication and/or peripheral devices and/or interfaces, and may each further include appropriate operating system software. Similarly, the Client Systems 14 may include any specific type of computer system or other type of client device, such as, for example, desktop computer systems, PDAs (Personal Digital Assistants), cell phones, tablet PCs, or any other appropriate device capable of providing a user interface for a Web conference to a user. The Server System(s) 10 and the Client Systems 14 may, for example, be interconnected through one or more data communication networks, such as the Internet, a Local Area Network (LAN), or any other specific type of communication system or network.

While a client-server embodiment is shown in FIG. 1, the disclosed system is not so limited. Accordingly, alternative embodiments may have the software, database, and/or document components shown in the Server System(s) 10 of FIG. 1 each stored within one or more of the Client Systems 14.

The Web Conference Application Server Software 12 may be embodied as any specific computer program that operates at least in part by providing Web conferences to participants.

During operation of the embodiment shown in FIG. 1, the Web Conference Application Server Software 12 collects user attributes from one or more of the Client Systems 14. These user attributes may, for example, indicate accessibility or other user settings and/or preferences associated with users of the client systems 14. As shown in FIG. 1, Client System 16 passes User Attributes 48 for Role 1 User 22 to the Web Conference Application Server Software 12, Client System 24 passes User Attributes 50 for Role 2 User 30 to the Web Conference Application Server Software 12, and Client System 32 passes User Attributes 52 to the Web Conference Application Server Software 12. The user attributes received from the Client Systems 48 are stored in the User Attributes 40 on the Server System(s) 10. User attributes may alternatively be obtained from one or more user information databases located externally to the Client Systems 14, e.g. from an employee user profile database, or from a user database associated with and/or maintained by the Web Conference Application Server Software 12.

The user attributes received from the Client Systems 14 may further include indications of user roles for a Web conference provided by the Web Conference Application Server Software 12. For example, the User Attributes 48 may include indication that the user of the Client System 16 has been associated with "Role 1" for an upcoming Web conference, User Attributes 50 may include indication that the user of the Client System 24 has been associated with "Role 2" for that Web conference, and User Attributes 52 may include indication that the user of the Client System 32 has been associated with "Role 3" for that Web conference. Information regarding the Web conference roles of the users of the Client Systems 14 is stored in the User Roles 42 on the Server System(s) 10. User roles for an upcoming Web conference may alternatively be obtained from data and/or databases located externally to the Client Systems 14, e.g. from a definition of an upcoming Web conference maintained by the Web Conference Application Server Software 12.

During a Web conference provided through the Web Conference Application Server Software 12, different renditions of a shared document, such as the Presentation Document 46 shown in FIG. 1, are automatically provided to different participants in the Web conference, based on the information stored in the User Roles 42 and/or User Attributes 40, and responsive to associations between user roles and specific document renditions defined by a sufficiently privileged user through a role-based renditions configuration user interface. The determination of which rendition to provide to which participant in the Web conference is made by Rendition Logic 44. For example, as shown in FIG. 1, a Document Rendition A 54 of the Presentation Document 46 is sent to those of Client Systems 14 having users associated with Web conference Role 1, e.g. Client System 16. Similarly, a Document Rendition B 56 of the Presentation Document 46 is sent to those of Client Systems 14 having users associated with Web conference Role 2, e.g. Client System 24. A Document Rendition C 58 of the Presentation Document 46 is sent to those of Client Systems 14 having users associated with Web conference Role 1, e.g. Client System 32.

The shared document renditions provided by the Web Conference Application Server Software 12 to Web conference participants may differ in various specific ways. For example, some renditions may include metadata contained in the Presentation Document 46, while other renditions would not include such metadata. Metadata in a shared document such as the Presentation Document 46 may include such contents as speaker notes or the like. Speaker notes and/or other metadata may, for example, be provided to a Web conference participant whose role in the Web conference is to present the contents of the Presentation Document 46 the other participants. Such a participant may be referred to as the "speaker" or "presenter" for the Web conference, and typically would have primary or exclusive control over the timing of how portions of the Presentation Document 46 or other shared content are shared with other Web conference participants, e.g. by indicating to the Web Conference Application Server Software 12 when a new slide of a slide presentation is to be displayed to other participants within the Web conference. The speaker or presenter may further be able to control other aspects of the Web conference in ways that other participants in the Web conference cannot. In the disclosed system, since the metadata is automatically provided to a participant having such a role is part of a rendition of the content of a shared document such as the Presentation Document 46, the metadata is provided synchronously with the non-metadata content of the shared document, so that relevant portions of metadata are viewed simultaneously with the content to which they relate and/or expand upon.

Metadata may also be provided to Web conference participants having other roles. For example, in a Web conference that is part of an on-line course, roles might be defined for the Instructor, one or more Assistant Instructors, an Administrator, as well as the Students. In such a case, renditions including metadata within a shared document such as the Presentation Document 46 might be sent by the Web Conference Application Server Software 12 to Web conference participants having the roles of Instructor and Assistant Instructor, and also possibly Administrator. The specific participant roles that are to be sent renditions including metadata may, for example, be indicated by a user with sufficient privileges with regard to that conference, such as the user that sets up or defines the Web conference, e.g. the Instructor, and through a roles-based renditions configuration user interface provided prior to and/or during the Web conference.

In another embodiment, the roles of participants in a Web conference, and hence the renditions they are provided, may be determined at least in part based on whether the participants are members of a business organization. For example, in the case of a presentation made to participants that are internal and external to a business organization, those participants that are internal could be assigned a first role, while those that are external a second role. The rendition for participants having the first role could be a full blown rendition, e.g. displaying complex content in three dimensions output from a CAD (Computer Aided Design) program or the like. Such a heavy weight rendition would be provided to internal participants based on the assumption that their respective user interfaces would be capable of displaying the content in three dimensions during the conference. However, the participants associated with the second role would be provided a rendition in which the complex content output from the CAD program was rendered in a simplified form, e.g. only in two dimensions. Thus external participants would be able to conveniently view the contents of the presentation in a simplified form, and without needing the same user interface or client system capabilities as the internal participants. Such a scenario could, for example, arise in the case of making a presentation through a Web conference, in which a complex product, part or the like is being shown both to internal and external Web conference participants.

In another embodiment of the disclosed system, the roles of participants may be based on the geographic locations of participants. Geographic locations participants used to determine their Web conference roles may be determined in a variety of specific ways. For example, the IP (Internet Protocol) address of each participant may be used to determine that participant's role. In another example, the participants user profile in a user database may be used to determine their geographic location.

Renditions provided by the Web Conference Application Server Software 12 may further vary between Web conference participants in response to the User Attributes 40. For example, if the User Attributes 40 indicate certain accessibility settings for a participant, then the rendition sent to that participant would be generated to match those settings. Such user accessibility settings include, for example, settings that call for a high contrast display in a participant's user interface (i.e. for a low vision user), settings that call for providing visual distinctions to be displayed between display objects in ways other than differing colors (i.e. for a color blind user), and others. Accordingly, in response to user attributes for a participant indicating an accessibility setting calling for high contrast display, a high contrast rendition would be provided to that participant. For example, such a high contrast display might include relatively bigger text and/or images than other renditions. In response to user attributes for a participant indicating an accessibility setting calling for displaying visual distinctions between display objects in ways other than differing colors, a rendition would provided to that participant in which color-based visual distinctions in the content of the Presentation Document 46 are made through other techniques (e.g. displaying text alternatives to non-text content, displaying increased variations in darkness between display objects, etc.).

Figure 2:
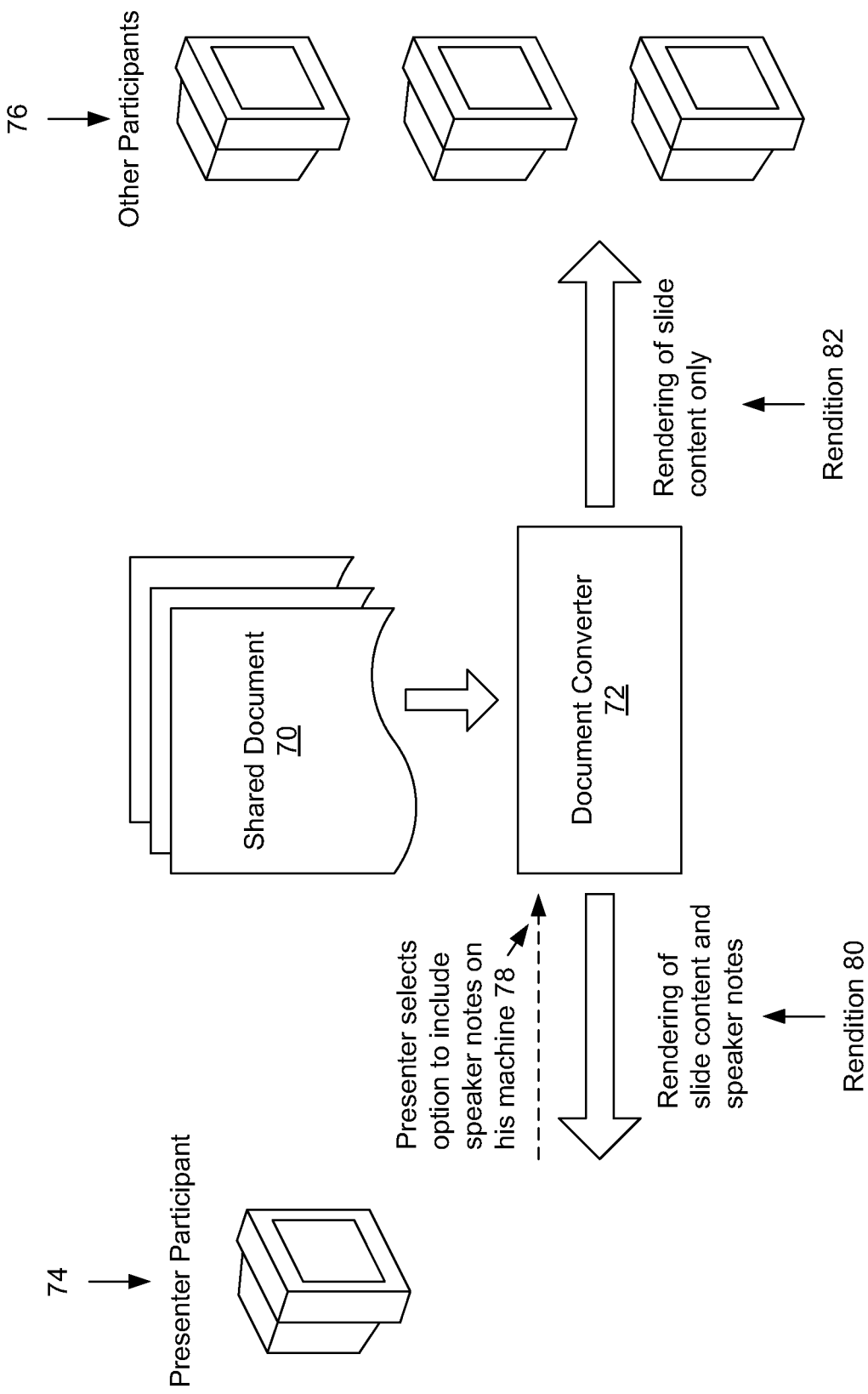
FIG. 2 is a block diagram showing operation of software components in an illustrative embodiment of the disclosed system.

FIG. 2 is a block diagram showing operation of software components in an illustrative embodiment of the disclosed system. As shown in FIG. 2, during a Web conference, a Shared Document 70 is passed through a Document Converter process 72. The Shared Document 70 corresponds to the Presentation Document 46 of FIG. 1, and the Document Converter 72 is an embodiment of the Rendition Logic 44 of FIG. 1. The Shared Document 70 may be any specific type of document being shared during the Web conference.

In the example of FIG. 2, the Shared Document 70 includes an ordered set of slides to be presented to participants in the Web conference as a slide show under the control of the Web conference presenter (i.e. the presenter controls when the slides in the slide show are changed). In addition, the Shared Document 70 includes metadata consisting of speaker notes associated with one or more of the slides contained in the Shared Document 70.

As further shown in FIG. 2, the Document Converter process 72 provides a rendition 80 that includes a rendering of the slides contained within the Shared Document 70 to the client computer system of a Presenter participant 74, such that the rendition 80 further includes the metadata contained within the Shared Document 70, i.e. the speaker notes. Accordingly, when the Presenter participant 74 views the Web conference, they are presented with the slide show as well as the speaker notes from the Shared Document 70. For example, the Document Converter 72 includes the metadata from within the Shared Document 70 in the rendition 80 in response to the Presenter 74 selecting 78 an option in the user interface provided to the Presenter 74 that indicates to the Document Converter 72 that the speaker note metadata from the Shared Document 70 is to be provided in the rendition 80 send to the client computer system of the Presenter participant 74. The Document Converter 72 also generates the rendition 82 of the Shared Document 70, and passes the rendition 82 to the client computer systems of Other Participants 76 of the Web conference, where the rendition 82 includes only the slide show from the Shared Document 70, but does not include the speaker note metadata from the Shared Document 70.

The speaker note metadata included within the rendition 80 may be displayed to the Presenter participant 74 by any specific mechanism within the user interface on the client computer system of the Presenter participant 74. The specific manner in which the speaker note metadata may, for example, be determined in response to preference settings of the Presenter participant 74. Examples of where the speaker note metadata could be disclosed by an embodiment of the disclosed system include at the bottom or at the side of the shared content within the user interface display window providing the Web conference, or within in a separate floating user interface display window located in proximity to the user interface display window providing the Web conference.

The selection by the Presenter 74 of the option that causes the speaker notes metadata to be included in the rendition 80 may be detected by the disclosed system in a variety of specific ways. For example, a dialog box may be displayed to the Presenter participant 74 at the time the Web conference begins, including an explanation that the Presenter participant 74 has the option of viewing speaker notes metadata on his or her client computer system, without showing the speaker notes metadata to the other Web conference participants. Such a dialog box may further include other options for the Presenter participant 74, such as options that enable the Presenter participant 74 to select how the speaker notes metadata are to be displayed in the rendition 80. Options in this regard, as mentioned above, include at the bottom shared slide show content, at the side of the shared slide show content, in a separate floating window, etc. For example, the Presenter participant 74 may check a checkbox to cause the slide show metadata to be included in the rendition 80, and check another check box to indicate the method of display, and then click on an "OK" button display object or the like.

Those skilled in the art should recognize that while in the example of FIG. 2, the Shared Document 70 is described as including a slide show, the disclosed system is not limited to operation with presentation documents containing slides. Accordingly, embodiments of the Document Converter 72 may be operable to render of metadata for a variety of specific types of shared documents.

Figure 3:
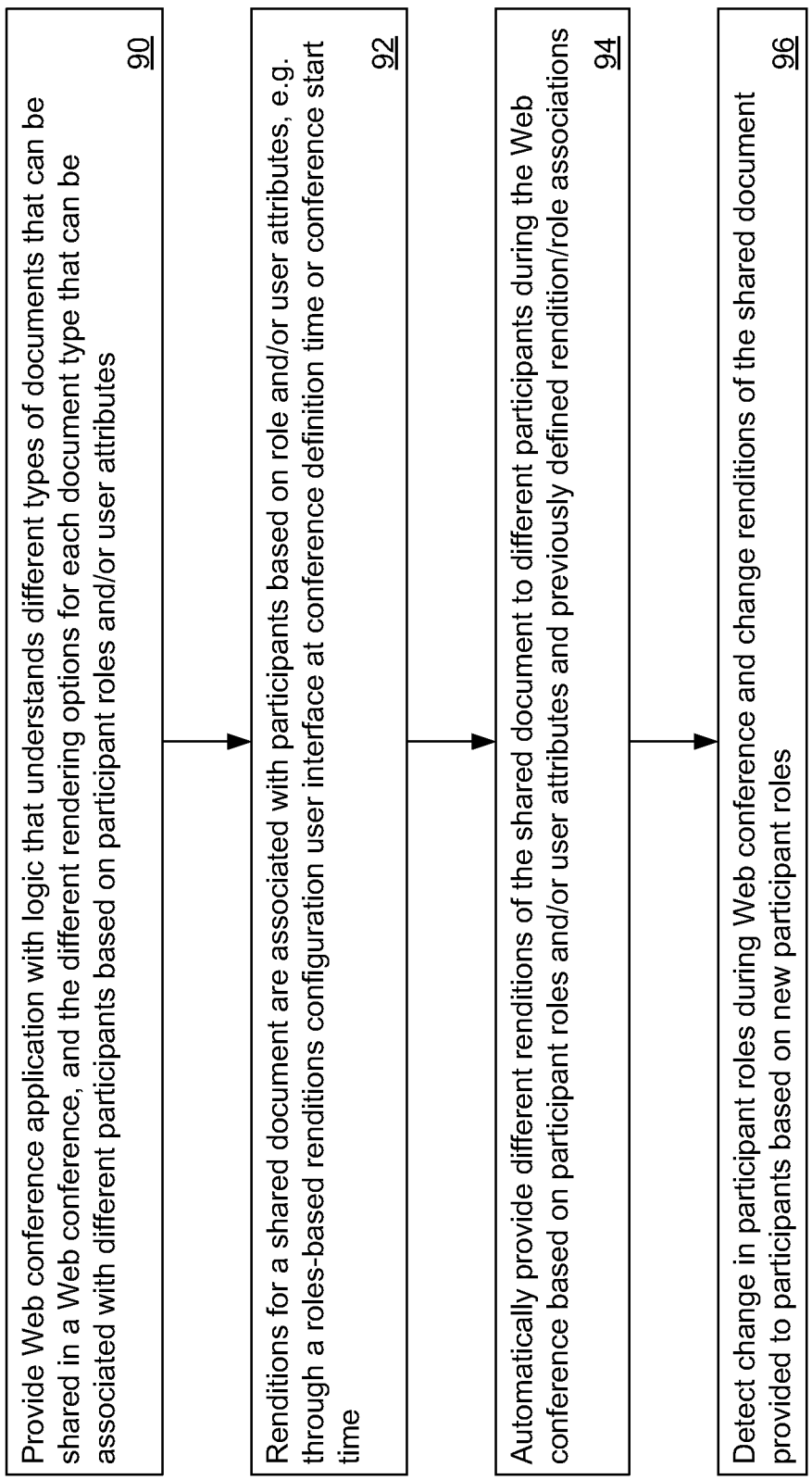
FIG. 3 is a flow chart showing steps performed by an illustrative embodiment of the disclosed system.

FIG. 3 is a flow chart showing steps performed by an illustrative embodiment of the disclosed system. At step 90, a Web conference application program is provided with program logic that understands different types of documents that can be shared in a Web conference, and the different rendering options for each document type that can be associated with different participants based on participant roles and/or user attributes. An embodiment of such program logic is the Rendition Logic 44 shown in FIG. 1. At step 92, renditions of a shared document are associated with participant roles and/or user attributes, for example at the time the Web conference is defined or scheduled by a presenting user, or at the time the Web conference starts, through a roles-based renditions configuration user interface.

The disclosed system operates during the Web conference at step 94 to automatically provide different renditions of the shared document to different participants based on participant roles and/or user attributes, and based on the previously defined associations between participant roles and document renditions obtained through the roles-based renditions configuration user interface. For example, in one embodiment a shared Web conference presentation document is controlled based on out-of-band signals received form the presenting user. Such out of band signals indicate, for example, that a next slide in a slide show is to be rendered. When a signal is received at the server system that a new slide is to be rendered, the rendition logic program code determines which renditions of the new slide are to be pushed to which participants. In an alternative embodiment, the disclosed system determines which rendition is to be sent to a given participant in response to receipt of a request (a "pull") for a new slide from that participant.

At step 96, the disclosed system detects a change in participant roles and/or a change in associations between roles and renditions during the Web conference, and changes the renditions of the shared document provided to participants in the Web conference based on the newly detected participant roles. For example, the Web conference user interface may be embodied to include a toolbar icon and/or menu command to bring up a role changing options dialog box, or a dialog box for changing associations between roles and renditions, at any time during a presentation, so that the presenting user can change these options during the presentation. Options relating to changing participant roles enable the disclosed system to allow the presenting user to change during a Web conference, and thereafter be provided with the proper rendition of the shared document for the presenting user, as indicated by the associations between renditions and participant roles, which also may be dynamically changed during the Web conference.

Figure 4:
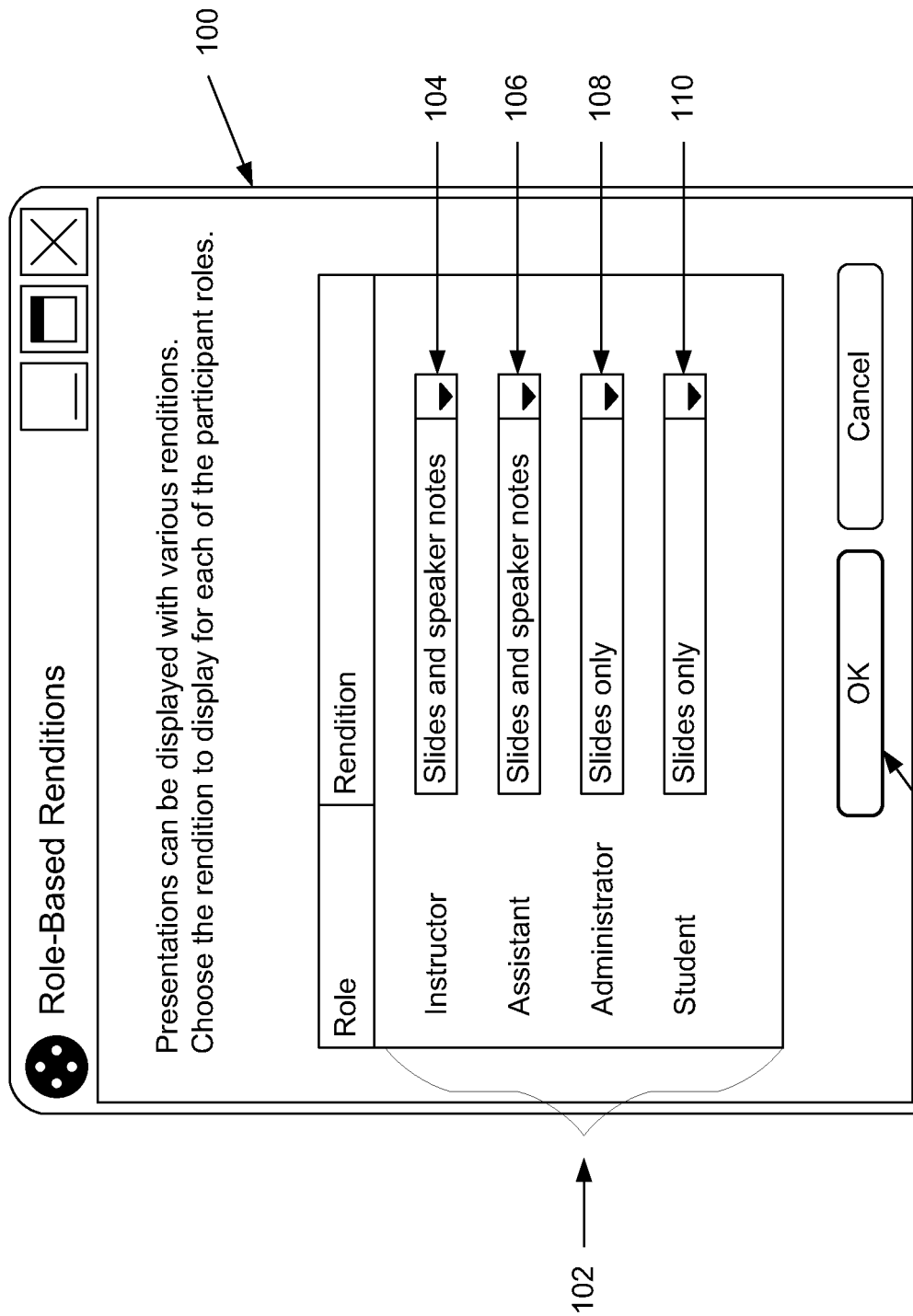
FIG. 4 is an example of a role-based renditions configuration user interface provided by an illustrative embodiment to enable a user to associate different renditions of a shared document with participant roles for a Web conference.

FIG. 4 is an example of a roles-based renditions configuration user interface 100 provided by an illustrative embodiment of the disclosed system to enable a user to associate different renditions of a document shared through a Web conference with Web conference participant roles. The user interface 100 may, for example, be displayed to a user that is scheduling a Web conference, and/or to a presenting user at the beginning of and/or during the Web conference. In the example of FIG. 4, in which an Instructor is presenting material through the Web conference, the Instructor role participant would be provided the user interface 100 at the beginning of the Web conference, and may also access the user interface 100 during the Web conference to change or update the renditions provided to participants in certain roles.

As shown in FIG. 4, the user interface 100 includes a list 102 of participant roles for a Web conference. In the example of FIG. 4, the participant roles are Instructor, Assistant, Administrator, and Student. Each of the participant roles in the list 102 is further provided with a pull down menu of rendition options. In one embodiment of the disclosed system, the rendition options provided by the pull down menus are determined based on the type of the shared document, since the document type would indicate what types of rendition options could be provided.

For example, the menu 104 for the Instructor role is shown with a "Slides and speaker notes" option selected, indicating that participants having the Instructor role are to be provided with a rendition of a shared presentation document that includes both a slide show and speaker notes metadata. Similarly, the menu 106 for the Assistant role is also shown with a "Slides and speaker notes" option selected, indicating that participants having the Assistant role are also to be provided with a rendition of the shared document that includes both a slide show and speaker notes metadata.

The menu 108 for the Administrator role participants is shown with the "Slides only" option selected, indicating that participants having the Administrator role are to be provided with a rendition of the shared document that includes only the slide show, and does not include the speaker notes metadata. Similarly, the menu 110 for the Student role participants is shown with the "Slides only" option selected, indicating that participants having the Student role are to be provided with a rendition of the shared document that includes only the slide show, and does not include the speaker notes metadata. When the user clicks on the "OK" button 112, the associations between participant roles and renditions are stored, for example in the User Roles 42 shown in FIG. 1.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method embodied in a computer system, comprising:
providing a rendition selection user interface at the beginning of a Web conference and during said Web conference to a participant in said Web conference who controls a shared document during said Web conference, wherein said rendition selection user interface enables associations to be made between roles of participants in said Web conference and renditions of said shared document, wherein said shared document is shared with participants in said Web conference during said Web conference, wherein a first one of said roles comprises an instructor role and a second one of said roles comprises a student role; and
selectively sending metadata from said shared document to different ones of said participants in said Web conference during said Web conference responsive to said roles of said participants at least in part by sending said metadata with non-metadata content of said shared document to participants in said Web conference having said instructor role and not sending said metadata to participants in said Web conference having said student role.

2. The method of claim 1, further comprising sending said metadata to participants having a role other than a role associated with said participant of said Web conference who controls said shared document during said Web conference.

3. The method of claim 2, wherein said role other than said a role associated with said participant of said Web conference who controls said shared document during said Web conference comprises an assistant instructor role.

4. The method of claim 2, wherein said role other than said a role associated with said participant of said Web conference who controls said shared document during said Web conference comprises an administrator role.

5. The method of claim 1, further comprising:
associating said roles with said participants of said Web conference in response to geographic locations of said participants of said Web conference, such that participants in a first geographic location are associated with a first role, and participants located in a second geographic location are associated with a second role.

6. The method of claim 1, further comprising:
associating said roles with said participants of said Web conference in response to whether said participants of said Web conference are members of a business organization, such that participants that are members of said business organization are associated with a first role, and participants that are not members of said business organization are associated with a second role.

7. A system including at least one processor and a non-transitory computer readable storage medium, said computer readable storage medium having program code stored thereon for execution on said processor, said program code comprising:
program code for providing a rendition selection user interface at the beginning of a Web conference and during said Web conference to a participant in said Web conference who controls a shared document during said Web conference, wherein said rendition selection user interface enables associations to be made between roles of participants in said Web conference and renditions of said shared document, wherein said shared document is shared with participants in said Web conference during said Web conference, wherein a first one of said roles comprises an instructor role and a second one of said roles comprises a student role; and
program code for selectively sending metadata from said shared document to different ones of said participants in said Web conference during said Web conference responsive to said roles of said participants at least in part by sending said metadata with non-metadata content of said shared document to participants in said Web conference having said instructor role and not sending said metadata to participants in said Web conference having said student role.

8. The system of claim 7, further comprising:
wherein said program code for selectively sending said metadata sends said metadata to participants having a role other than a role associated with said participant of said Web conference who controls said shared document during said Web conference.

9. The system of claim 8, wherein said role other than said a role associated with said participant of said Web conference who controls said shared document during said Web conference comprises an assistant instructor role.

10. The system of claim 8, wherein said role other than said a role associated with said participant of said Web conference who controls said shared document during said Web conference comprises an administrator role.

11. The system of claim 7, said program code further comprising:
program code for associating said roles with said participants of said Web conference in response to geographic locations of said participants of said Web conference, such that participants in a first geographic location are associated with a first role, and participants located in a second geographic location are associated with a second role.

12. The system of claim 7, said program code further comprising:
program code for associating said roles with said participants of said Web conference in response to whether said participants of said Web conference are members of a business organization, such that participants that are members of said business organization are associated with a first role, and participants that are not members of said business organization are associated with a second role.

13. A computer program product in a non-transitory computer readable storage medium, said computer readable storage medium having program code stored thereon, said program code comprising:
program code for providing a rendition selection user interface at the beginning of a Web conference and during said Web conference to a participant in said Web conference who controls a shared document during said Web conference, wherein said rendition selection user interface enables associations to be made between roles of participants in said Web conference and renditions of said shared document, wherein said shared document is shared with participants in said Web conference during said Web conference, wherein a first one of said roles comprises an instructor role and a second one of said roles comprises a student role; and
program code for selectively sending metadata from said shared document to different ones of said participants in said Web conference during said Web conference responsive to said roles of said participants at least in part by sending said metadata with non-metadata content of said shared document to participants in said Web conference having said instructor role and not sending said metadata to participants in said Web conference having said student role.

* * * * *